Dec. 1, 1936. E. N. SORENSEN 2,062,946
WASHING AND GRADING MACHINE
Filed Jan. 19, 1935 2 Sheets-Sheet 1
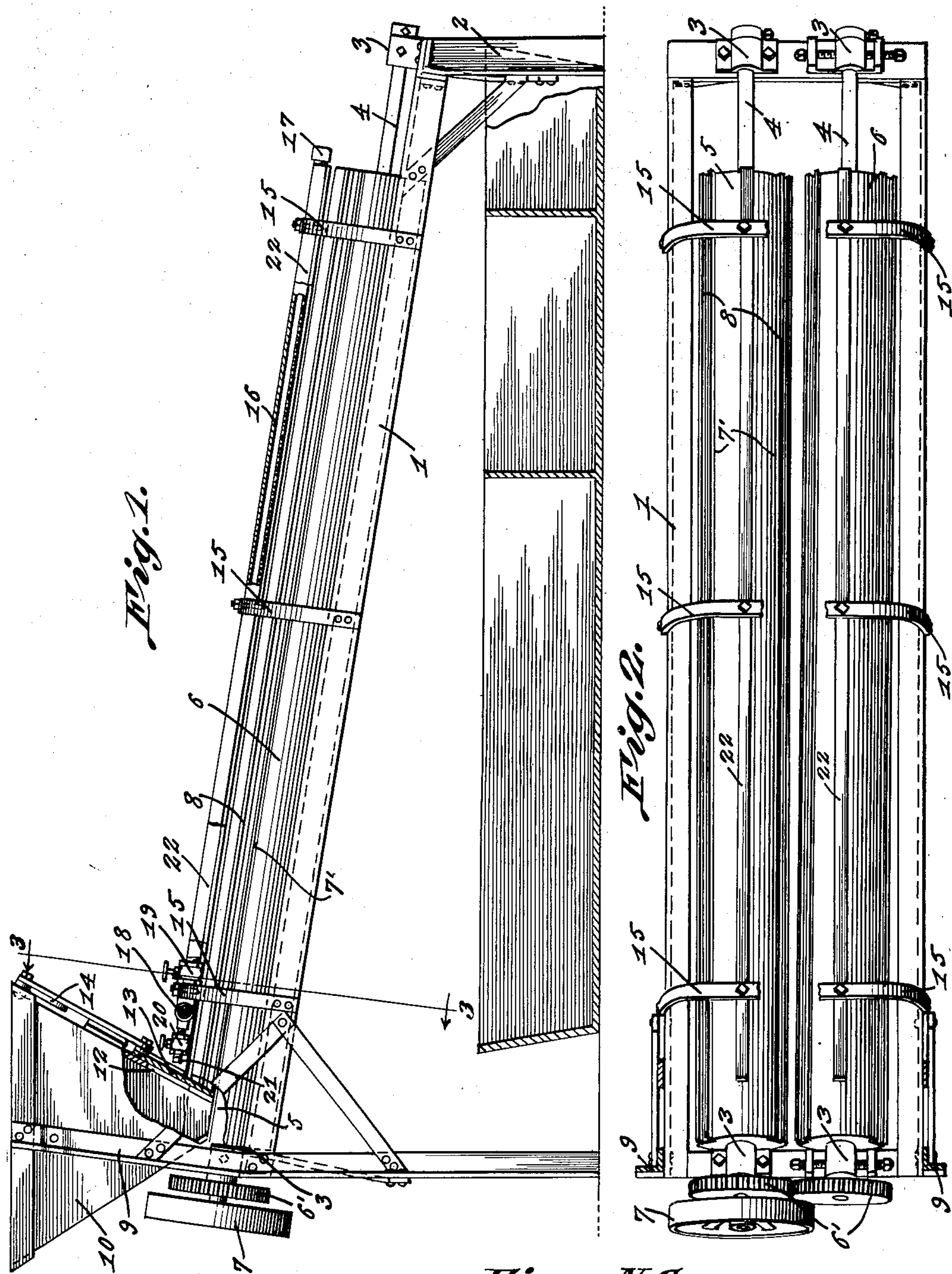
Einar N. Sorensen, INVENTOR
BY Victor J. Evans & Co.
ATTORNEYS Dec. 1, 1936. E. N. SORENSEN 2,062,946
WASHING AND GRADING MACHINE
Filed Jan. 19, 1935 2 Sheets-Sheet 2
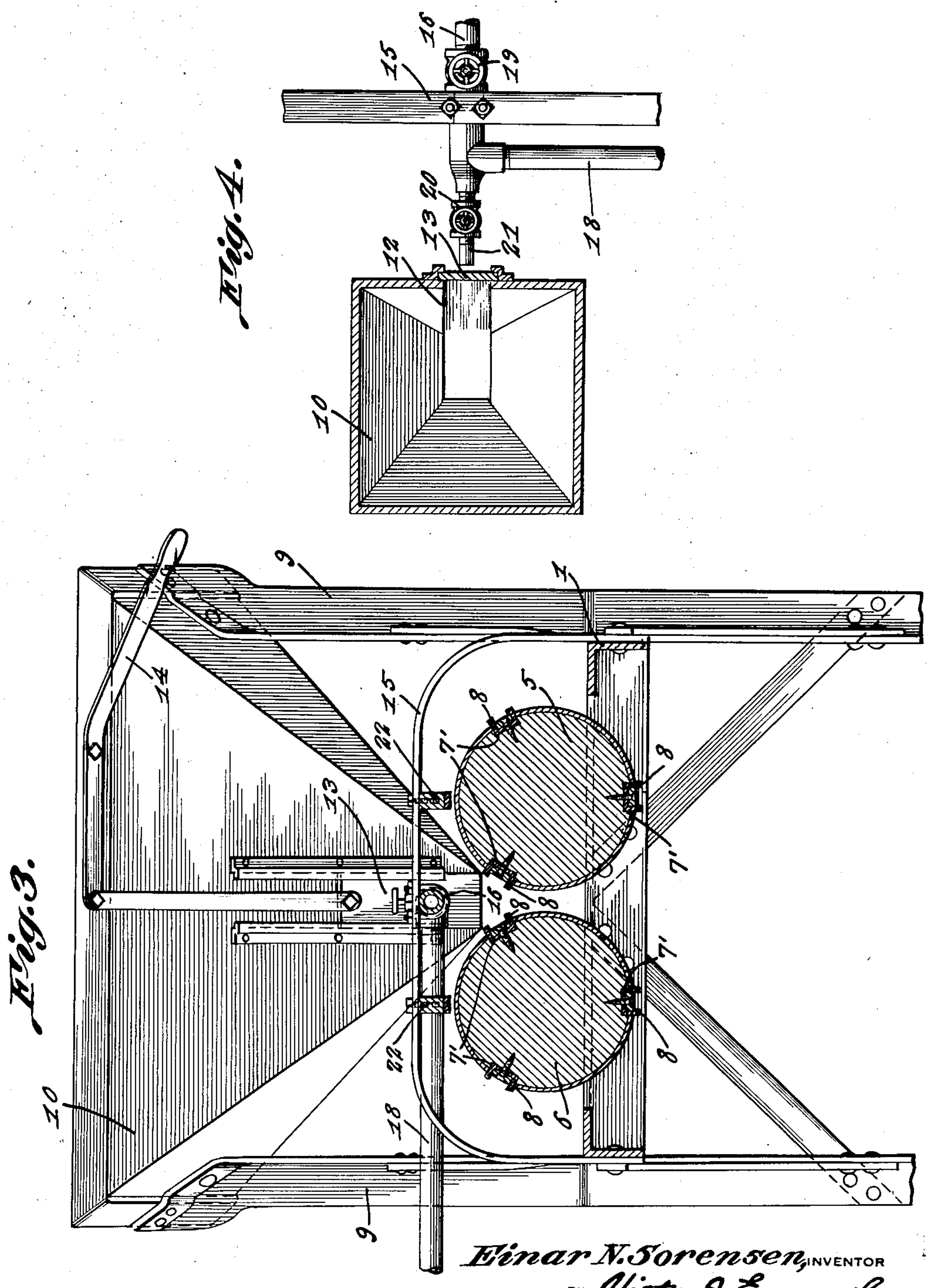
Einar N. Sorensen, INVENTOR
BY Victor J. Evans & Co.
ATTORNEYS Patented Dec. 1, 1936

2,062,946

UNITED STATES PATENT OFFICE 2,062,946

WASHING AND GRADING MACHINE

Einar N. Sorensen, Fernandina, Fla., assignor of one-half to Byron B. Brooks, Jacksonville, Fla.

Application January 19, 1935, Serial No. 2,569

1 Claim. (Cl. 17—6)

This invention relates to machines for the treatment of various foodstuffs, principally shrimp, fish and the like, and has for the primary object the provision of means whereby a large number of shrimp or fish may be subjected to a thorough bath with agitation to remove slime, dirt and the like therefrom and thereby rendering the shrimp or fish nonadhering to one another and then separating said shrimp or fish as to size.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a machine for the treatment of foodstuffs and constructed in accordance with my invention.

Figure 2 is a top plan view illustrating the same.

Figure 3 is a sectional view taken on the line 3—3 of Figure 1.

Figure 4 is a fragmentary plan view showing means of introducing water to the feed hopper of the machine when desired.

Referring in detail to the drawings, the numeral 1 indicates a main frame supported by legs 2 so that said frame slopes in the direction of one of its ends. Journals or bearings 3 are carried by the ends of the frame and rotatably support shafts 4 of rollers 5 and 6. The rollers extend substantially the full length of the frame and the shafts are connected by gears 6'. A belt wheel 7 is secured to the shaft 4 of the roller 5 whereby the device may be belted to a power source. The rollers thus geared together when rotated will rotate in opposite directions to one another. The bearings 3 which support the shaft of the roller 6 are of the adjustable type whereby the roller 6 may be adjusted towards and from the roller 5 for varying the size of the space between the rollers. It is preferable that the roller 6 be adjusted with respect to the roller 5 so that said rollers will diverge from one another from their upper ends towards their lower ends. Each roller has formed in its periphery grooves 7' extending the full length of the roller and in which are removably mounted channel-shaped elements 8, the edges of which project slightly beyond the periphery of the roller. The elements 8 are constructed of rubber or any other material suitable for the purpose and provide for the rollers agitators.

A supporting structure 9 is carried by the upper end of the frame 1 and supports a hopper 10 having its discharge end arranged to deliver the contents of said hopper onto the rollers for gravitation thereover and for agitation thereby. One side of the hopper is provided with an opening 12 opened and closed by a gate 13, the latter being controlled through a suitable operating mechanism 14.

Bowed members 15 are secured to the frame 1 and arranged transversely thereof over the rollers and support above the space between the rollers a water spray pipe 16, one end of which is closed by a cap 17 and the opposite end connected to a water head 18 by a control valve 19. The water head 18 may be connected in any suitable manner to a water supply (not shown). Also connected to the water head 18 is a control valve 20 having its discharge or outlet 21 disposed opposite the opening 12 so that water may be introduced into the hopper for the purpose of subjecting the contents of the hopper to a bath prior to passing from the hopper onto the roller.

Arranged under the space between the rollers is a series of receptacles for catching the shrimp or fish from the machine.

In operation, shrimp, fish or the like are deposited in the hopper and with the rollers rotating in opposite directions, the shrimp, fish or the like are constantly agitated and subjected to a bath of water during their movement from the upper ends of the rollers towards the lower ends of said rollers to remove therefrom slime, dirt and other foreign matter. The shrimp or fish thus bathed and agitated will become free of one another and pass between said rollers into the receptacles provided therefor in accordance with the sizes of the shrimp or fish, it being understood that the largest shrimp or fish, or the ones which cannot pass between the rollers, will gravitate off of the lower ends of the rollers into the receptacle provided therefor.

In some instances where the shrimp or fish are of mass formation when placed in the hopper, they may be subjected to water under pressure by opening the valve 20 and the gate 13.

While this invention has been principally described for the treatment of shrimp or fish, it is to be understood that other foodstuffs, such as potatoes, apples and the like can be treated thereby.

Wipers 22 are secured to the bowed members 15 and parallel the rollers 5. The wipers are of substantially the same length as the rollers and are spaced a limited distance from the peripheries of the rollers to permit the agitators to pass the wipers. The wipers are arranged at opposite sides of the space between the rollers and act to deflect shrimp, fish or the like towards the space between the rollers when the shrimp or fish tend to follow the direction of rotation of said rollers.

Having described the invention, I claim:

In a machine for removing slime and dirt from fish or the like, a frame having a pair of parallel inclined rollers journaled longitudinally on the frame, bearings for the rollers, the bearings for one roller comprising lateral adjustable members, intermeshing gears for the journals at one end of the rollers, means for revolving one of said gears, each of said rollers having spaced peripheral grooves extending the length thereof, a flexible channeled member seated in each of said grooves and having its side flange projected beyond the periphery of the roller, bowed guards carried by the frame and disposed over the rollers and longitudinally extending wiper strips carried by the guards and disposed in close proximity to the channeled members, in combination with a valve controlled spray pipe for directing water onto and between the rollers.

EINAR N. SORENSEN.